US012308534B2

(12) United States Patent
Kaneko

(10) Patent No.: US 12,308,534 B2
(45) Date of Patent: May 20, 2025

(54) ANTENNA DEVICE

(71) Applicant: Nissei Limited, Tokyo (JP)

(72) Inventor: Tutomu Kaneko, Tokyo (JP)

(73) Assignee: Nissei Limited, Tokyo (JP)

( * ) Notice: Subject to any disclaimer, the term of this patent is extended or adjusted under 35 U.S.C. 154(b) by 224 days.

(21) Appl. No.: 18/201,338

(22) Filed: May 24, 2023

(65) Prior Publication Data

US 2023/0387599 A1 Nov. 30, 2023

(30) Foreign Application Priority Data

May 30, 2022 (JP) ................................ 2022-087805

(51) Int. Cl.

*H01Q 9/26* (2006.01)
*H01Q 1/22* (2006.01)
*H01Q 5/364* (2015.01)
*H01Q 5/48* (2015.01)
*H01Q 9/28* (2006.01)
*H01Q 21/30* (2006.01)

(52) U.S. Cl.

CPC ........... *H01Q 9/265* (2013.01); *H01Q 1/2291* (2013.01); *H01Q 5/364* (2015.01); *H01Q 5/48* (2015.01); *H01Q 9/285* (2013.01); *H01Q 21/30* (2013.01)

(58) Field of Classification Search

CPC .......... H01Q 1/2291; H01Q 1/36; H01Q 1/38; H01Q 5/28; H01Q 5/30; H01Q 5/307; H01Q 5/357; H01Q 5/364; H01Q 5/40; H01Q 5/48; H01Q 7/00; H01Q 9/16; H01Q 9/26; H01Q 9/265; H01Q 9/28; H01Q 9/285; H01Q 21/24; H01Q 21/245; H01Q 21/26; H01Q 21/28; H01Q 21/30

See application file for complete search history.

(56) References Cited

U.S. PATENT DOCUMENTS

2022/0102858 A1* 3/2022 Kaneko .................... H01Q 1/38

FOREIGN PATENT DOCUMENTS

JP 2022054525 A 4/2022
JP 2022087805 A 6/2022

* cited by examiner

*Primary Examiner* — Robert Karacsony
(74) *Attorney, Agent, or Firm* — von Briesen & Roper, s.c.

(57) ABSTRACT

Provided is an antenna device capable of realizing isolation of more than 20 dB while keeping its size compact.

The antenna device comprises a semicircular arc shaped first outer antenna element and first inner antenna element, which are formed concentrically on one surface of an insulating substrate, a semicircular arc shaped second outer antenna element and second inner antenna element, which are formed concentrically on another surface of the insulating substrate, an antenna-side coupling unit formed on the one surface of the insulating substrate, and a feed coupling unit formed in a reversed stated by 180 degrees with respect to the coupling unit on the other surface of the insulating substrate. The first outer antenna element and the second outer antenna element are connected to the antenna-side coupling unit via connection lines and a first through hole and the first inner antenna element and the second inner antenna element are connected to the antenna-side coupling unit via connection lines and a second through hole.

4 Claims, 6 Drawing Sheets

ANTENNA DEVICE

CROSS-REFERENCE TO RELATED APPLICATION

This application claims priority under 35 U.S.C. § 119 and the Paris Convention to Japanese Patent Application 2022-087805 filed on May 30, 2022.

TECHNICAL FIELD

The present invention relates to an antenna device provided with circularly polarized antennas for multiple frequency bands.

BACKGROUND ART

In a mobile phone and a wireless LAN (Local Area Network), using a communication system called MIMO (Multi Input Multi Output), multiple antennas for the same frequencies are connected to one wireless communication device. MIMO is a wireless communication technology in which multiple antennas are used at both the transmitter and the receiver so as to realize high throughput and high reliability of communication. In actually designing the system, there has been a problem how to implement the multiple antennas in a terminal demanded to be compact.

As an example of an antenna device of this type, Patent Literature 1 discloses a substrate-type antenna comprising: an arcuate antenna element including a first arcuate antenna element and a second arcuate antenna element, wherein each of the first arcuate antenna element and the second arcuate antenna element includes, from an outer circumference of each antenna element to an inner circumference thereof, an integrated antenna element compatible with three frequency bands and a single antenna element compatible with one frequency band and arranged with a space from the integrated antenna element; a plurality of connection units connected to the first arcuate antenna element and the second arcuate antenna element, respectively; and a coupler to which the plurality of connection units is coupled.

In the antenna device according to Patent Literature 1, a long arcuate antenna element, which is the first arcuate antenna element, and a short arcuate antenna element, which is the second arcuate antenna element, are formed concentrically around a center point on a substrate surface, and these long arcuate antenna element and short arcuate antenna element are divided so as to face each other at a distance. Each of the long arcuate antenna element and the short arcuate antenna element has the outer integrated antenna element for three frequency bands, and the single antenna element for one frequency band spaced inwardly of the integrated antenna element, and the coupler is formed in a central portion of the substrate surface. The coupler has four coupling elements formed into an oval shape and arranged at a distance from each other, and each of the coupling elements has a divided portion and separated via a gap. The long arcuate antenna element and the short arcuate antenna element are connected to each other at the divided portions of each of the coupling elements using individual connection patterns.

Specifically, the outermost coupling element is connected to the single antenna element of the long arcuate antenna element and the integrated antenna element of the short arcuate antenna element via one connection pattern, the innermost coupling element is connected to the integrated antenna element of the long arcuate antenna element and the single antenna element of the short arcuate antenna element via a different connection pattern, and the remaining two coupling elements are connected to the integrated antenna element of the long arcuate antenna element and the integrated antenna element of the short arcuate antenna element via further different connection patterns. Thus, the long arcuate antenna element and the short arcuate antenna element are connected to the coupling elements of the coupler using the four connection patterns, respectively, whereby a circularly polarized dipole antenna is configured as a whole.

CITATION LIST

Patent Literature

Patent Literature 1: JP-A-2022-54525

SUMMARY OF INVENTION

Technical Problem

In the antenna device according to Patent Literature 1, an antenna element is divided into the long arcuate antenna element and the short arcuate antenna element, and they are concentrically arranged on the substrate surface so as to face each other. Adjusting the total length of these long arcuate antenna element and short arcuate antenna element enables the axial ratio (AR) of the antenna to be adjusted to 3 dB or less (antenna to antenna isolation is 15 dB or less) which is necessary for a circularly polarized wave. However, the antenna structure is formed with a combination of a circularly polarized antenna, in which an inner single antenna element of the long arcuate antenna element and an outer integrated antenna element of the short arcuate antenna element are connected to each other by a connection pattern, and a circularly polarized antenna, in which an inner single antenna element of the short arcuate antenna element and an outer integrated antenna element of the long arcuate antenna element are connected to each other by another connection pattern, and thus it has been difficult to realize antenna to antenna isolation of 20 dB or more which is necessary in 5G mobile telephone terminals, Wi-Fi6 (IEEE802.11ax), or the like.

The present invention has been made in view of the circumstances of the prior art as described above, and an object of the present invention is to provide an antenna device capable of realizing isolation of more than 20 dB while keeping its size compact.

Solution to Problem

In order to achieve the object described above, one of the aspects of the present invention is provided as an antenna device in which two circularly polarized dipole antennas for different frequency bands are arranged on a common insulating substrate, the antenna device comprising: a first outer antenna element and a first inner antenna element, each of the first outer antenna element and the first inner antenna element being formed into a semicircular arc shape with a different radius around a common center point on one surface of the insulating substrate; a second outer antenna element and a second inner antenna element, each of the second outer antenna element and the second inner antenna element being formed into a semicircular arc shape with a different radius around a common center point on another surface of the insulating substrate; a first connection line formed on the one surface of the insulating substrate, the first connection line being designed to connect the first outer antenna element and the second outer antenna element via a through hole provided in the insulating substrate; a second connection line formed on the one surface of the insulating substrate, the second connection line being designed to connect the first inner antenna element and the second inner antenna element via a through hole provided in the insulating substrate; a coupling unit formed on the one surface of the insulating substrate so as to couple the first connection line and the second connection line; and a feed coupling unit formed on the other surface of the insulating substrate so as to face the coupling unit, the first outer antenna element and the second outer antenna element being arranged on a common arc so as to be consecutive in an annular shape in a plan view, and the first inner antenna element and the second inner antenna element being arranged on a common arc so as to be consecutive in an annular shape in a plan view.

Advantageous Effects of Invention

According to the antenna device of the present invention, it is possible to realize isolation of more than 20 dB while keeping its size compact.

DESCRIPTION OF EMBODIMENTS

Hereinafter, an embodiment of the present invention will be described with reference to the drawings.

An antenna device according to the present embodiment is an antenna device for MIMO antennas in 2.4 GHz band (2400 MHz to 2484 MHz) and 5 GHz band (5150 MHz to 5250 MHz, 5250 MHz to 5350 MHz, 5470 MHz to 5725 MHz) of Wi-Fi6.

Figure 1:
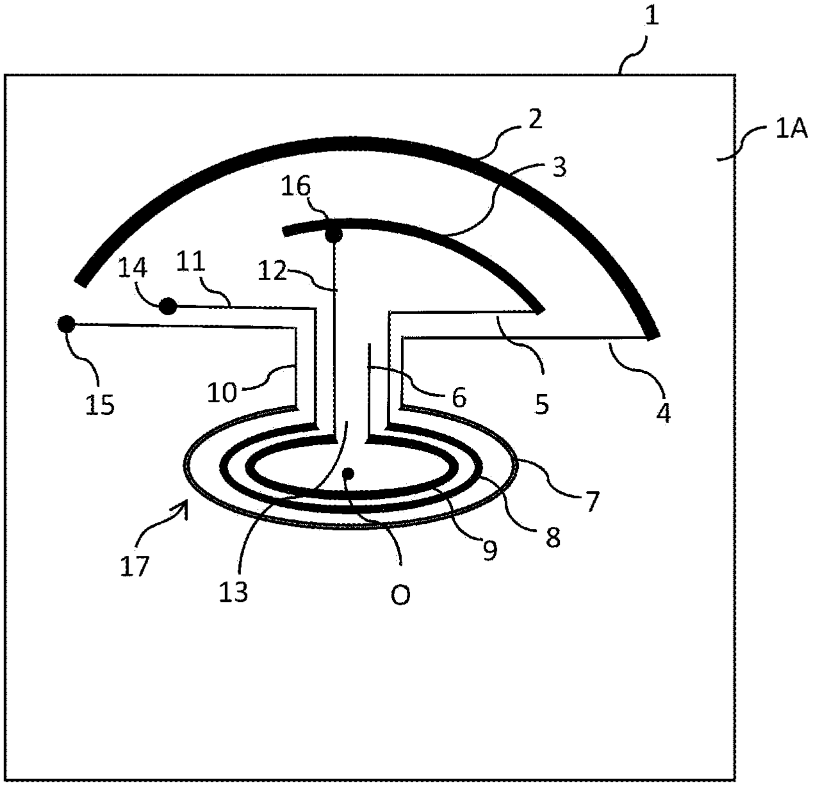
FIG. 1 is a plan view illustrating an antenna pattern of an antenna device according to an embodiment.
Figure 2:
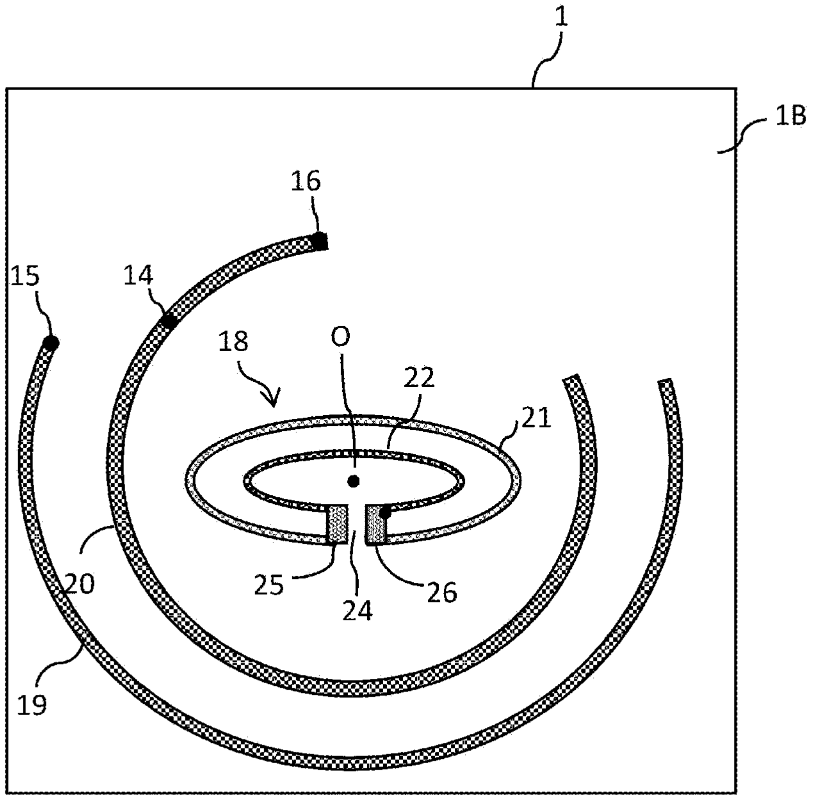
FIG. 2 is a back side view illustrating an antenna pattern of the antenna device according to the embodiment.
Figure 3:
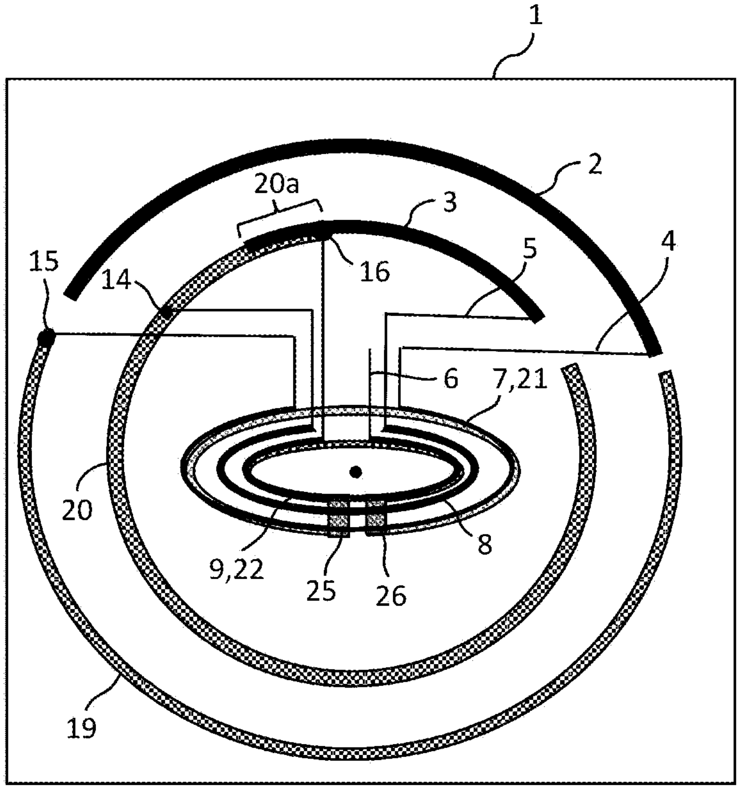
FIG. 3 is a perspective view of the antenna patterns illustrated in FIG. 1 and FIG. 2 as viewed from above an insulating substrate.

FIG. 1 is a plan view illustrating an antenna pattern of the antenna device according to the present embodiment, FIG. 2 is a back side view illustrating an antenna pattern of the antenna device, and FIG. 3 is a perspective view of the antenna patterns illustrated in FIG. 1 and FIG. 2 as viewed from above an insulating substrate. The antenna device illustrated in FIG. 1 to FIG. 3 is a circular polarized dipole antenna for Wi-Fi 6. In this antenna device, two arcuate antenna elements, which are the minimum configuration elements of multiple antenna elements, are arranged on the front and back surfaces of an insulating substrate, respectively.

As illustrated in FIG. 1, a front surface 1A of an insulating substrate 1 is provided with a first outer antenna element 2, a first inner antenna element 3, and an antenna-side coupling unit 17. The insulating substrate 1 is a plate-like member made of a dielectric material such as glass epoxy resin, and in the present embodiment, a FR-4 substrate having a dielectric constant of 4.3 (plate thickness is 0.3 mm) is used.

The first outer antenna element 2 and the first inner antenna element 3 are formed into a semicircular arc shape with different radii around the common center point O. The first inner antenna element 3 is spaced inwardly of the first outer antenna element 2, and the arc length of the first outer antenna element 2 is set to be sufficiently longer than the arc length of the first inner antenna element 3.

The antenna-side coupling unit 17 includes three coupling elements 7, 8, 9 arranged so as to surround the center point O. The coupling elements 7, 8, 9 are formed into an elliptical shape and spaced from each other. Where the three coupling elements are referred to as a first coupling element 7, a second coupling element 8, and a third coupling element 9 in this order from the outside, the first to third coupling elements 7, 8, 9 are partially divided to have a gap 13.

The first outer antenna element 2 is connected to the first coupling element 7 via a first connection line 4, and further via another first connection line 10, is connected to a first through hole 15. The first inner antenna element 3 is connected to the second coupling element 8 via a second connection line 5, and further via another second connection line 11, is connected to a second through hole 14. A pair of third connection lines 6, 12 are connected to the third coupling element 9, and although these third connection lines 6, 12 are not connected to the first outer antenna element 2 and the first inner antenna element 3, the third connection line 12 is connected to a third through hole 16. The first to third through holes 14, 15, 16 are formed by plating through holes provided in the insulating substrate 1.

As illustrated in FIG. 2, a back surface 1B of the insulating substrate 1 is provided with a second outer antenna element 19, a second inner antenna element 20, and a feed coupling unit 18. The second outer antenna element 19 and the second inner antenna element 20 are formed into a semicircular arc shape with different radii around the common center point O.

The second outer antenna element 19 is disposed on a circular arc having the same radius as that of the first outer antenna element 2 formed on the front surface 1A of the insulating substrate 1. These first outer antenna element 2 and second outer antenna element 19 form a true circle in plan view, and the first through hole 15 is connected to an end of the second outer antenna element 19.

The second inner antenna element 20 is spaced inwardly of the second outer antenna element 19, and the arc length of the second inner antenna element 20 is set to be sufficiently longer than the arc length of the second outer antenna element 19. The second inner antenna element 20 is disposed on an arc having the same radius as that of the first inner antenna element 3 formed on the front surface 1A of the insulating substrate 1. These first inner antenna element 3 and second inner antenna element 20 form a true circle in plan view, and the second through hole 14 and the third through hole 16 are connected to the end side of the second inner antenna element 20.

The feed coupling unit 18 includes an outer feed coupling element 21 and an inner feed coupling element 22 which are arranged so as to surround the center point O. These outer feed coupling element 21 and inner feed coupling element 22 are spaced apart from each other and formed into an elliptical shape. Each of the outer feed coupling element 21 and the inner feed coupling element 22 has a divided gap 24. The feed coupling unit 18 is disposed in a reversed state by 180 degrees in plan view with respect to the antenna-side coupling unit 17 formed on the front surface 1A of the insulating substrate 1. That is, the outer feed coupling element 21 and the first coupling element 7 overlap each other in a mutually reversed state, and the inner feed coupling element 22 and the third coupling element 9 overlap each other in a mutually reversed state. Furthermore, both end portions of the feed coupling elements 21, 22 which are divided across the gap 24 are provided with feed points 25, 26, respectively. As will be described later, a center conductor and external conductor of a signal cable (coaxial cable) are to be selectively connected to these feed points 25, 26.

As illustrated in FIG. 3, when the antenna patterns formed on the front surface 1A and back surface 1B of the insulating substrate 1 are transparently viewed in plan from above, the first outer antenna element 2 and the second outer antenna element 19 are arranged to form a true circle. In the present embodiment, the length is adjusted so that the phase rotates by 360 degrees on the arc of the first outer antenna element 2 and second outer antenna element 19, and thus the length is adjusted for the frequency in 2.4 GHz band. Furthermore, one end of the first outer antenna element 2 is connected to the first coupling element 7 via the first connection line 4, and further via the first connection line 10 and the first through hole 15, is connected to one end of the second outer antenna element 19, whereby a first circularly polarized dipole antenna for 2.4 GHz band is configured.

In the same manner as above, the first inner antenna element 3 and the second inner antenna element 20 are also arranged to form a true circle. The second inner antenna element 20 has an overlapping portion 20*a* where a portion of the first inner antenna element 3 overlaps the second inner antenna element 20 in plan view. Providing the overlapping portion 20*a* makes the total length of the first inner antenna element 3 and second inner antenna element 20 long. In the present embodiment, the length is adjusted so that the phase rotates by 360 degrees on the arc of the second inner antenna element 20 including the arc length of the first inner antenna element 3 and the overlapping portion 20*a*, and thus the length is adjusted for the frequency in 5 GHz band. Furthermore, one end of the first inner antenna element 3 is connected to the second coupling element 8 via the second connection line 5, and further via the second connection line 11 and the second through hole 14, is connected to a portion near one end of the second inner antenna element 20, whereby the second circularly polarized dipole antenna for 5 GHz band is configured.

Furthermore, the third connection line 6 is connected to the third coupling element 9, and also is connected to the overlapping portion 20*a* of the second inner antenna element 20 via the third through hole 16 from the third connection line 12 connected to the third coupling element 9, so that the bandwidth of the second circularly polarized dipole antenna is widened.

Still further, since the antenna-side coupling unit 17 and the feed coupling unit 18 are arranged on both the front and back surfaces of the insulating substrate 1, respectively, in a state where they face each other in a mutually reversed state by 180 degrees in plan view, the antenna-side coupling unit 17 and the feed coupling unit 18 are electrostatic-capacitively coupled, and thus the gain due to the radio waves in each frequency band, which have been received by the first circularly polarized dipole antenna and second circularly polarized dipole antenna, is generated on the feed coupling unit 18. Then, by connecting a signal cable to the two feed points 25, 26 of the feed coupling unit 18, the gain of the first circularly polarized dipole antenna and the gain of the second circularly polarized dipole antenna are combined, as well as the impedance is matched to 50Ω and the combined gain can be obtained from the signal cable. At this time, changing the connection form of the center conductor and the external conductor of the signal cable with respect to the two feed points 25, 26 of the feed coupling unit 18 enables each of the first and second circularly polarized dipole antennas to be operated as either a right-handed circularly polarized antenna or a left-handed circularly polarized antenna.

Figure 4:
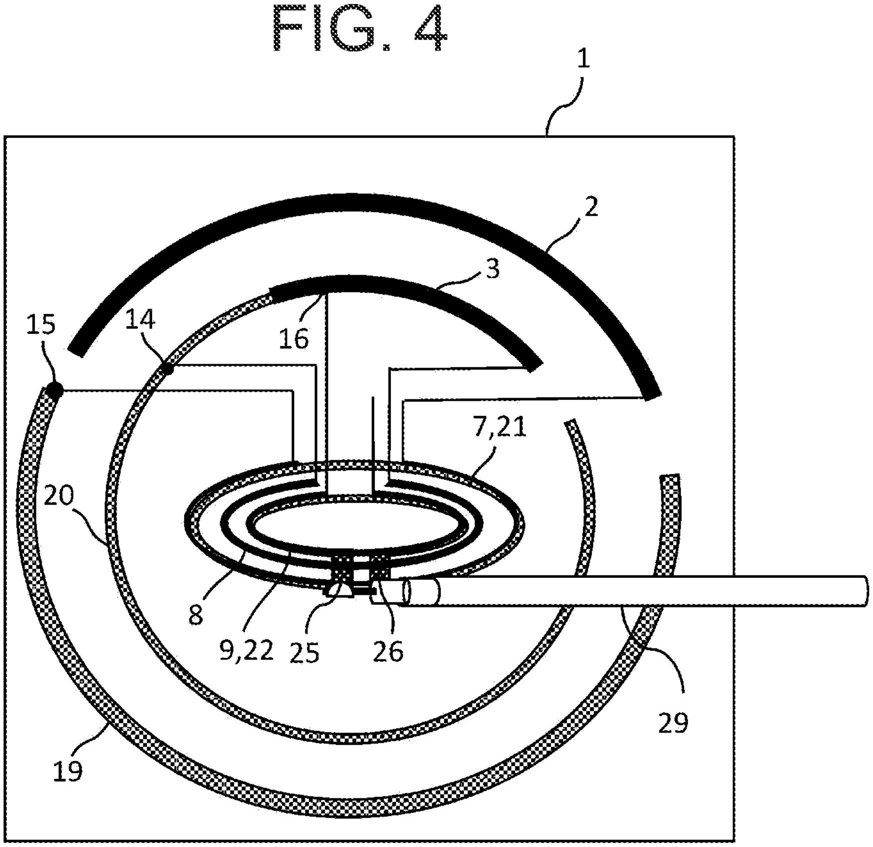
FIG. 4 is a diagram for explaining the case where the antenna device according to the embodiment operates as a right-handed circularly polarized antenna.

That is, as illustrated in FIG. 4, in the case of connecting the center conductor of a signal cable (coaxial cable) 29 to the feed point 25 on the left side of FIG. 4 and connecting the external conductor serving as a GND line to the feed point 26 on the right side of FIG. 4, the gain of the right-handed circularly polarized antenna is obtained from the signal cable 29. On the other hand, as illustrated in FIG. 5, in the case of connecting the external conductor (GND line) of the signal cable 29 to the feed point 25 on the left side of FIG. 5 and connecting the center conductor to the feed point 26 on the right side of FIG. 5, the gain of the left-handed circularly polarized antenna is obtained from the signal cable 29.

Next, an operation of the antenna device according to the present embodiment will be described with reference to FIG. 6 to FIG. 9.

Figure 5:
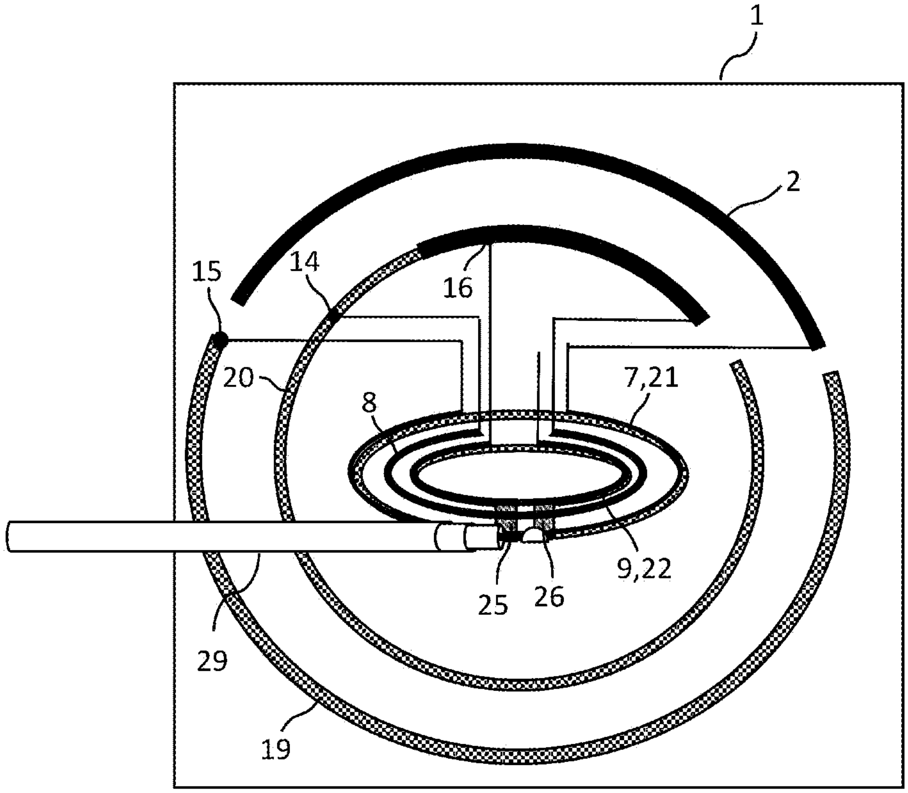
FIG. 5 is a diagram for explaining the case where the antenna device according to the embodiment operates as a left-handed circularly polarized antenna.
Figure 6:
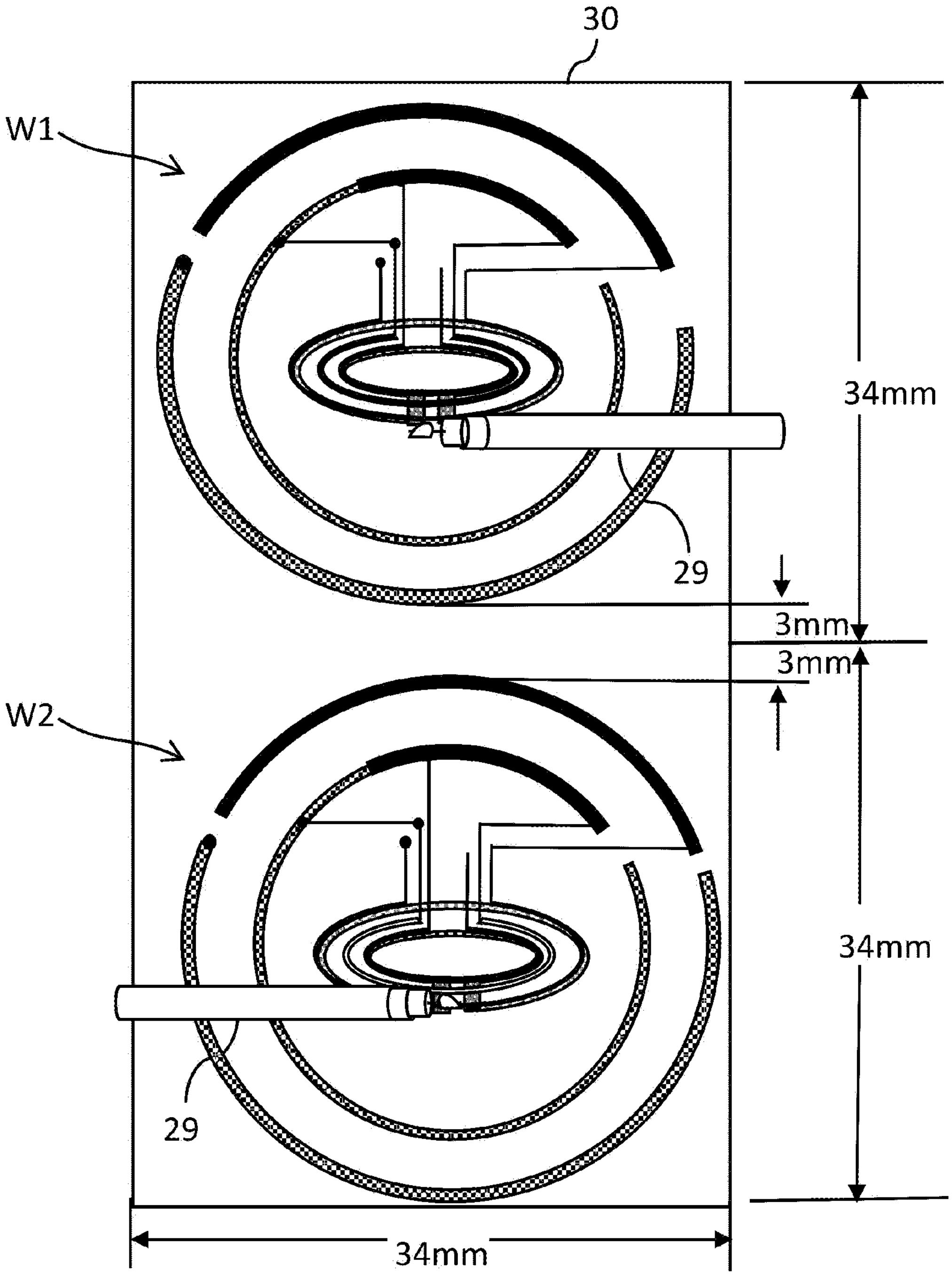
FIG. 6 is a diagram for explaining a state in which the two antenna devices illustrated in FIG. 4 and FIG. 5 are disposed close to each other.

FIG. 6 is a diagram for explaining a state in which the right-handed circularly polarized antenna W1 illustrated in FIG. 4 and the left-handed circularly polarized antenna W2 illustrated in FIG. 5 are disposed close to each other on an insulating substrate 30. As illustrated in FIG. 6, both the right-handed circularly polarized antenna W1 and the left-handed circularly polarized antenna W2 have the dimensions of 34 mm×34 mm, and are disposed close to each other on the insulating substrate 30 with a distance of 6 mm (3 mm×2 mm) between the respective antenna patterns.

Figure 7:
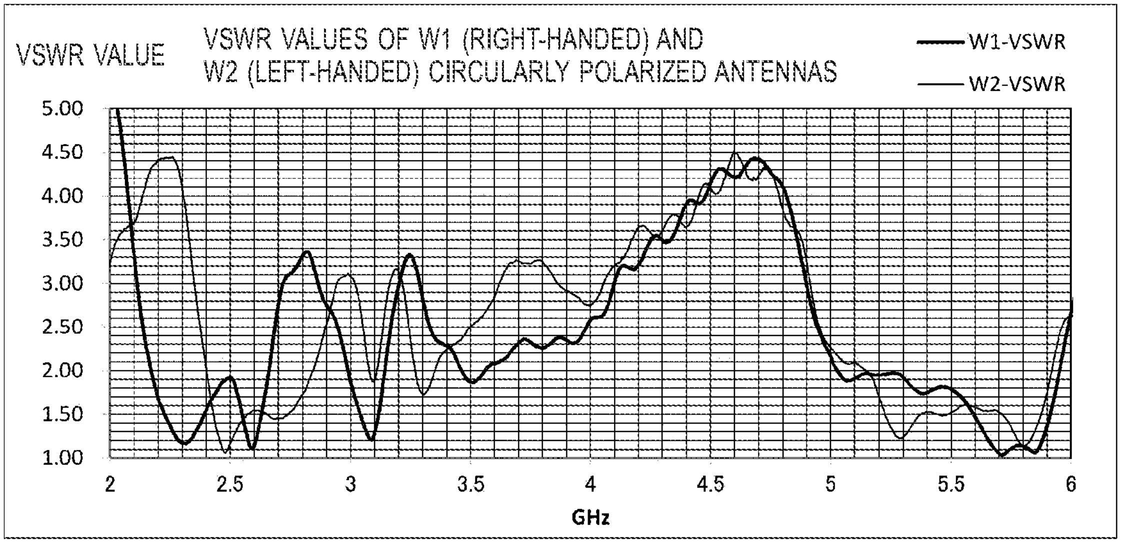
FIG. 7 illustrates a graph showing a standing wave ratio (VSWR value) of the two antennas illustrated in FIG. 6.

FIG. 7 illustrates a graph showing a standing wave ratio (VSWR value) of the two antennas W1, W2 in the case where the front surface of the insulating substrate 30 illustrated in FIG. 6 is attached to the back side of a case cover made of polycarbonate resin in the thickness of 2 mm. In FIG. 7, the horizontal axis represents frequency and the vertical axis represents a VSWR value. As illustrated in FIG. 7, in the case where the two antennas W1, W2 are arranged with the dimensions as illustrated in FIG. 6, the VSWR values in both 2.4 GHz band and 5 GHz band can be 2 or less.

Figure 8:
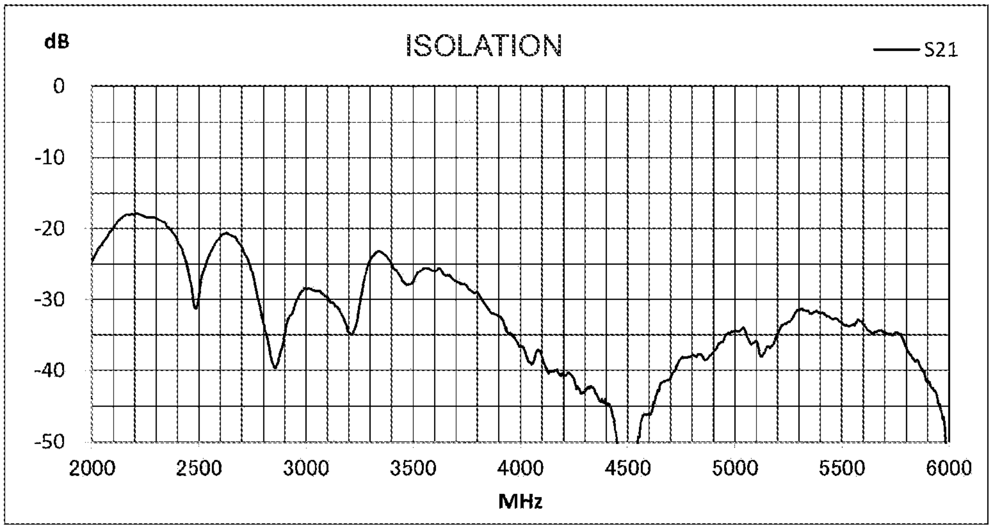
FIG. 8 illustrates a graph showing isolation between the two antennas illustrated in FIG. 6.

FIG. 8 illustrates a graph showing isolation between the two antennas W1, W2. As illustrated in FIG. 8, in the case where the two antennas W1, W2 are arranged with the dimensions as illustrated in FIG. 6, the isolation in both 2.4 GHz band and 5 GHz band can be 20 dB or more.

Figure 9:
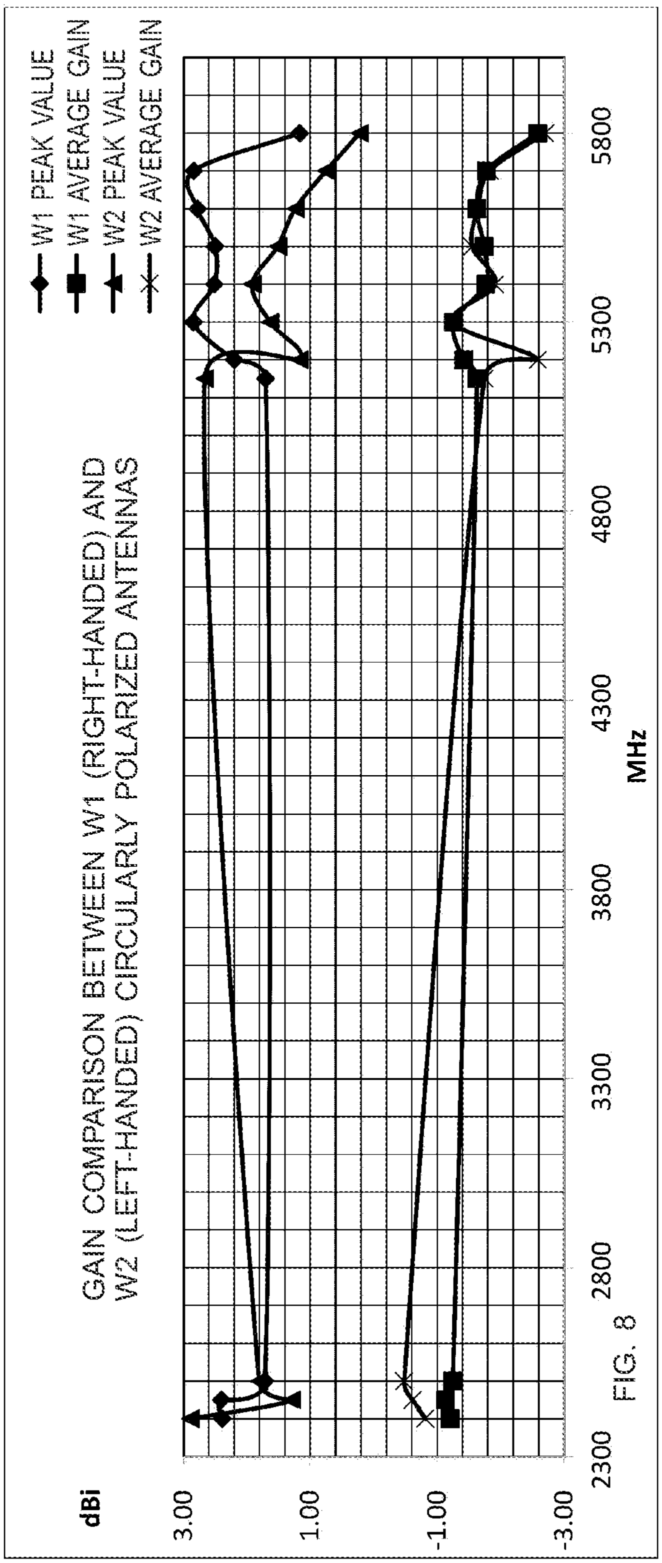
FIG. 9 illustrates a graph showing, in 2.4 GHz band and 5 GHz band, maximum values and average values of gain of the two antennas.

FIG. 9 illustrates a graph showing, in 2.4 GHz band and 5 GHz band, maximum values and average values of the gain of the two antennas W1, W2. In FIG. 9, the horizontal axis represents frequency and the vertical axis represents gain due to a circularly polarized wave. As illustrated in FIG. 9, in the case where the two antennas W1, W2 are arranged with the dimensions as illustrated in FIG. 6, there is no large variation in the gain in 2.4 GHz band and that in 5 GHz band, which shows that gain can be stably secured as a whole.

As described above, in the antenna device according to the present embodiment, the first outer antenna element 2 and second outer antenna element 19 for the frequency in 2.4 GHz band are distributed to the front and back surfaces of the insulating substrate 1, respectively, and the first inner antenna element 3 and second inner antenna element 20 for the frequency in 5 GHz band are distributed to the front and back surfaces of the insulating substrate 1, respectively. These two pairs of antenna elements are concentrically arranged around the common center point O. Then, the first outer antenna element 2 and the second outer antenna element 19 are connected to the antenna-side coupling unit 17 via the connection line 4, 10 and the first through hole 15, and the first inner antenna element 3 and the second inner antenna element 20 are connected to the antenna-side coupling unit 17 via the different connection lines 5, 11 and the second through hole 14. The connection lines 4, 5, 6, 10, 11, 12 are provided on the insulating substrate 1 without making them cross each other, whereby two circularly polarized dipole antennas having antenna elements which have a shape close to a true circle without phase difference are configured.

Furthermore, since the antenna-side coupling unit 17 and the feed coupling unit 18 are arranged on both the front and back surfaces of the insulating substrate 1, respectively, in a state where they face each other in a mutually reversed state by 180 degrees in plan view, the antenna-side coupling unit 17 and the feed coupling unit 18 are electrostatic-capacitively coupled, and thus the gain of the first circularly polarized dipole antenna and that of the second circularly polarized dipole antenna, are generated on the feed coupling unit 18. Then, by connecting the signal cable 29 to the two feed points 25, 26 of the feed coupling unit 18, the gain of the first circularly polarized dipole antenna and the gain of the second circularly polarized dipole antenna are combined, as well as the impedance is matched to 50Ω and the combined gain can be obtained from the signal cable 29. At this time, changing the connection form of the center conductor and external conductor of the signal cable 29 with respect to the two feed points 25, 26 of the feed coupling unit 18 enables each of the first and second circularly polarized dipole antennas to be operated as either a right-handed circularly polarized antenna or a left-handed circularly polarized antenna.

Furthermore, the second inner antenna element 20 has the overlapping portion 20_a_ where a portion of the first inner antenna element 3 overlaps the second inner antenna element 20 in plan view, and also the antenna-side coupling unit 17 is provided with a third coupling element 9 formed in an elliptical shape and having a gap 13. This third coupling element 9 is connected to the overlapping portion 20_a_ via the third through hole 16 from the third connection line 12. This widens the range in which the arc length of the first inner antenna element 3 and that of the second inner antenna element 20 can be adjusted, and therefore, it is possible to realize the wider bandwidth of the circularly polarized antenna formed with the first inner antenna element 3 and the second inner antenna element.

As described above, the antenna device according to the present embodiment is a half-wave dipole antenna, and the diameter of an arc of an arcuate antenna element can be adjusted to the length allowing a circularly polarized wave phase of the corresponding frequency to rotate by 360 degrees. In the case where an arc shaped antenna element is short, disposing one of the semicircular arc shaped antenna elements on the front surface side of the insulating substrate, disposing the other semicircular arc shaped antenna element on the back surface side of the insulating substrate, and connecting between these semicircular arc shaped antenna elements using the connection lines and through holes enables adjustment of the length of the antenna elements without making the left and right semicircular arc shaped antenna elements contact each other. This also realizes reduction in the size of the antenna.

Furthermore, in the state where the gain obtained from the signal cable connected to the feed points of the feed coupling unit is the right-handed circularly polarized antenna, connecting the signal cable to the feed points in a reverse manner causes the left-handed circularly polarized antenna using the same antenna pattern. Still further, forming the arc-shaped antenna element of the right-handed circularly polarized antenna (a pair of two semicircular arc shaped antenna elements) into the shape close to a true circle causes the axial ratio (AR) to be 2 dB or less, and in the same manner, also causes the axial ratio of the left-handed circularly polarized antenna to be 2 dB or less. The relation of isolation between the right-handed circularly polarized wave and the left-handed circularly polarized wave is 20 dB when AR=2 dB and is 25 dB when AR=1 dB based on the cross polarization discrimination (XPD). Thus, even arranging the right-handed circularly polarized antenna and the left-handed circularly polarized antenna formed as described above side by side and close to each other in the smallest area, in the circularly polarized antenna formed with two antenna elements, the antenna to antenna isolation is equal to or more than 20 dB when both axial ratios are controlled to be equal to or less than 2 dB.

The present invention is not limited to the embodiment described above, and various modifications can be made without departing from the concept of the present invention. All technical matters included in the technical idea described in the claims are the subject of the present invention. The embodiment above has illustrated preferred examples, however, those skilled in the art can realize various alternatives, modifications, variations, and improvements from the disclosure herein, and these fall within the scope of the appended claims.

For example, in the embodiment described above, the case where the feed coupling unit 18 is formed with two elements including the outer feed coupling element 21 and the inner feed coupling element 22 has been described, however, the outer feed coupling element 21 and the inner feed coupling element 22 may be formed with one integrated element, or may be formed with three elements corresponding to the three coupling elements 7, 8, 9 of the antenna-side coupling unit 17.

REFERENCE SIGNS LIST

1 insulating substrate
2 first outer antenna element
3 first inner antenna element
4, 10 first connection line
5, 11 second connection line
6, 12 third connection line

7 first coupling element
8 second coupling element
9 third coupling element
13 gap
14 second through hole
15 first through hole
16 third through hole
17 antenna-side coupling unit
18 feed coupling unit
19 second outer antenna element
20 second inner antenna element
**20*a*** overlapping portion
21 outer feed coupling element
22 inner feed coupling element
24 gap
25, 26 feed point
29 signal cable
W1 right-handed circularly polarized antenna
W2 left-handed circularly polarized antenna

The invention claimed is:

1. An antenna device in which two circularly polarized dipole antennas for different frequency bands are arranged on a common insulating substrate, the antenna device comprising:

a first outer antenna element and a first inner antenna element, each of the first outer antenna element and the first inner antenna element being formed into a semicircular arc shape with a different radius around a common center point on one surface of the insulating substrate;

a second outer antenna element and a second inner antenna element, each of the second outer antenna element and the second inner antenna element being formed into a semicircular arc shape with a different radius around a common center point on another surface of the insulating substrate;

a first connection line formed on the one surface of the insulating substrate, the first connection line being designed to connect the first outer antenna element and the second outer antenna element via a through hole provided in the insulating substrate;

a second connection line formed on the one surface of the insulating substrate, the second connection line being designed to connect the first inner antenna element and the second inner antenna element via a through hole provided in the insulating substrate;

a coupling unit formed on the one surface of the insulating substrate so as to couple the first connection line and the second connection line; and a feed coupling unit formed on the other surface of the insulating substrate so as to face the coupling unit, the first outer antenna element and the second outer antenna element being arranged on a common arc so as to be consecutive in an annular shape in a plan view, and the first inner antenna element and the second inner antenna element being arranged on a common arc so as to be consecutive in an annular shape in a plan view.

2. The antenna device according to claim 1, wherein the coupling unit includes a first coupling element to which the first connection line is connected and a second coupling element to which the second connection line is connected, each of the first coupling element and the second coupling element is formed into an elliptical shape in which a portion thereof is divided, and the second coupling element is spaced inwardly of the first coupling element.

3. The antenna device according to claim 2, wherein the second inner antenna element is provided with an overlapping portion where the second inner antenna element overlaps a portion of the first inner antenna element in a plan view, a third coupling element formed into an elliptical shape and having a divided portion is spaced inwardly of the second coupling element, and a third connection line to be connected to the third coupling element is connected to the overlapping portion via a through hole provided in the insulating substrate.

4. The antenna device according to claim 3, wherein the feed coupling unit is disposed in a reversed state by 180 degrees in a plan view with respect to the coupling unit.

* * * * *